United States Patent [19]

Raikes et al.

[11] Patent Number: 5,024,282

[45] Date of Patent: Jun. 18, 1991

[54] ELECTRONIC POSTAL RATING SCALE OPERABLE IN METRIC AND AVOIRDUPOIS WEIGHT UNITS

[75] Inventors: Terry E. Raikes, Santa Rosa; William L. Kramer, Windsor; John B. Howard, Forestville, all of Calif.; Wayne D. Moore, North York, Canada; Louis Jackson, Milford; Jeffrey D. Kotecki, Newtown, both of Conn.

[73] Assignee: Pitney Bowes Inc., Stamford, Conn.

[21] Appl. No.: 465,675

[22] Filed: Jan. 16, 1990

[51] Int. Cl.⁵ .................. G01G 19/40; G06F 15/20
[52] U.S. Cl. .................. 177/25.15; 364/464.03
[58] Field of Search ............. 177/25.15; 364/464.03

[56] References Cited

U.S. PATENT DOCUMENTS

| 4,308,579 | 12/1981 | Dlugos | 364/466 X |
| 4,535,419 | 8/1985 | Dlugos et al. | 177/25.15 X |
| 4,595,984 | 6/1986 | Daniels | 364/466 |
| 4,868,757 | 9/1989 | Gil | 177/25.15 X |

Primary Examiner—George H. Miller, Jr.
Attorney, Agent, or Firm—Nathaniel Levin; David E. Pitchenik; Melvin J. Scolnick

[57] ABSTRACT

An electronic postal scale measures the weight of an item in metric or in avoirdupois units, at the user's election. The scale also calculates a postal or shipping rate for the item, in accordance with a stored rate table defined in either metric or avoirdupois units. When the user selects a class of service, the scale determines whether there is a stored rate table for that class in the currently elected weight units. If not, the scale automatically changes to the other weight units and calculates a rate according to a stored table in those other units.

15 Claims, 5 Drawing Sheets

```
TESTING 3                                              PAGE    1
1234, ANYSTREET                              SHIPPER NO. :  UPSMAN
ANYTOWN ONTARIO          UPS MANIFEST              DATE 25/05/89
M5N1A1                                         PICKUP NO    123123

TRANS    PACKAGE ID    P.CODE/   KG/      CHARGES    COD      DV     AOD OS CT
                       ZONE      LBS.OZ*

1        00004       /24       0 230     14.00
  2        00007       /22       LTR        8.50    514.35  1000.00      *
  3        00010       /87       0 230     30.00
  4        00016       T/6       0 230      2.46             650.00          *
  5        00018       /87       LTR       17.00
  6        00023       /22       0 08.0*   11.00

SUMMARY    2 DOMESTIC AIR
           1 CALL TAG
           1 DOMESTIC AIR LETTER
           1 USA AIR
           1 USA AIR LETTER

——————WEIGHT——CHARGES————COD————AOD———OS———CT——
                                              CHRG    CHRG

KG           5         0 690      71.96
LBS.OZ*      1         0  8.0*    11.00
                                            1         1     0    1
TOTAL CHARGES                    $82.96    $2.25    $.35

EXCESS VALUE:    15 UNITS   $3.75

GRAND TOTAL     $85.56
```

5,024,282

ELECTRONIC POSTAL RATING SCALE OPERABLE IN METRIC AND AVOIRDUPOIS WEIGHT UNITS

FIELD OF THE INVENTION

The invention relates to an electronic postal/shipping scale that provides a weight and a postage charge for an item to be shipped in either metric or avoirdupois units.

BACKGROUND OF THE INVENTION

Electronic postal/shipping scales (hereinafter "postal scales") are known. Prior art postal scales are described in U.S. Pat No. 4,718,506, and copending patent application Ser. No. 139,881, both of which are assigned to the assignee of this application and the disclosures of which are incorporated herein by reference.

The avoirdupois system of measuring weight, based on ounces and pounds, is used in the United States. The metric system of measuring weight, based on grams and kilograms, is used in Europe. In some countries both weight measuring systems are used.

The amount charged by parcel carriers (which term should be understood to include postal authorities) for carriage of a particular item often depends on the weight of the item, the desired destination for the item and the class of service to be provided. From this point forward "class" should be understood to mean a particular class of service provided by a particular parcel carrier. Typically for each class a rate table is provided which specifies the amount to be charged according to the weight category into which the item falls and, perhaps, also according to the zone in which the destination is located. The weight categories for a given rate table must, of course, be defined in terms of either avoirdupois or metric units. Some carriers, in some countries, may provide for a given class two rate tables, one defined in avoirdupois units and the other in metric units. For other classes, only one rate table is provided, the table being defined in one of the weight measuring systems.

Postal scales according to prior art have been able to display an item's weight either in avoirdupois or metric units, at the operator's option. But such prior art scales were capable of automatically calculating parcel rates only from rate tables defined in one of the weight measuring systems ("supported units") and not from rate tables defined in the other system ("nonsupported units"). Thus, if a user of such a scale desired to use a class for which the rate table was defined in the nonsupported units, he either had to manually calculate the rate from a printed rate chart or he had to employ a second postal scale that could calculate rates from a rate table defined in the nonsupported units.

Similar inconvenience arose for classes for which there were alternative rate tables, one defined in metric and the other in avoirdupois. For such classes the user might find it advantageous to compare the rates applicable to a particular item according to both tables in order to see if a rate according to one table was lower. For example, assume that for a particular class with alternative rate tables, the charge for shipping an item weighing one pound or less is $2.00, while the charge for an item weighing more than a pound but not more than two pounds is $2.50. Further assume that according to the metric rate table, the $2.00 charge applies to items weighing 500 grams or less, and the $2.50 charge applies to items weighing more than 500 grams but not more than a kilogram. For an item weighing more than a pound (454 grams) but not more than 500 grams, it would be advantageous to use the metric rate table, which provides a shipping charge of $2.00 as compared to the avoirdupois rate table, which provides a $2.50 charge. In such a case, with prior art scales, the user had to consult a second scale or a printed rate table, in order to compare the charges resulting from the alternative rate tables.

SUMMARY OF THE INVENTION

It is an object of this invention to provide an electronic postal scale that determines the weight, and corresponding rate, for an item in both metric and avoirdupois rate units. An electronic postal scale according to the present invention includes means that provides a signal representing the weight of the item, and means for generating input signals, including a weight system selection signal. The scale also includes a rate table memory and a microprocessor. The microprocessor receives the weight signal and the weight system selection signal and selects a weight system in accordance with the weight selection signal. The microprocessor then calculates a postal rate for the item in accordance with the weight signal, the selected weight system and a rate table stored in the rate table memory.

According to another aspect of the invention, for a given class selected by the user, the microprocessor determines if a rate table defined in the currently selected weight system is available in the rate table memory. If not, the microprocessor selects another weight system and calculates a postal rate for the item in accordance with the other weight system.

Other objects, features and advantages of the invention will become apparent in light of the following description thereof.

DETAILED DESCRIPTION OF THE INVENTION

Figure 1:
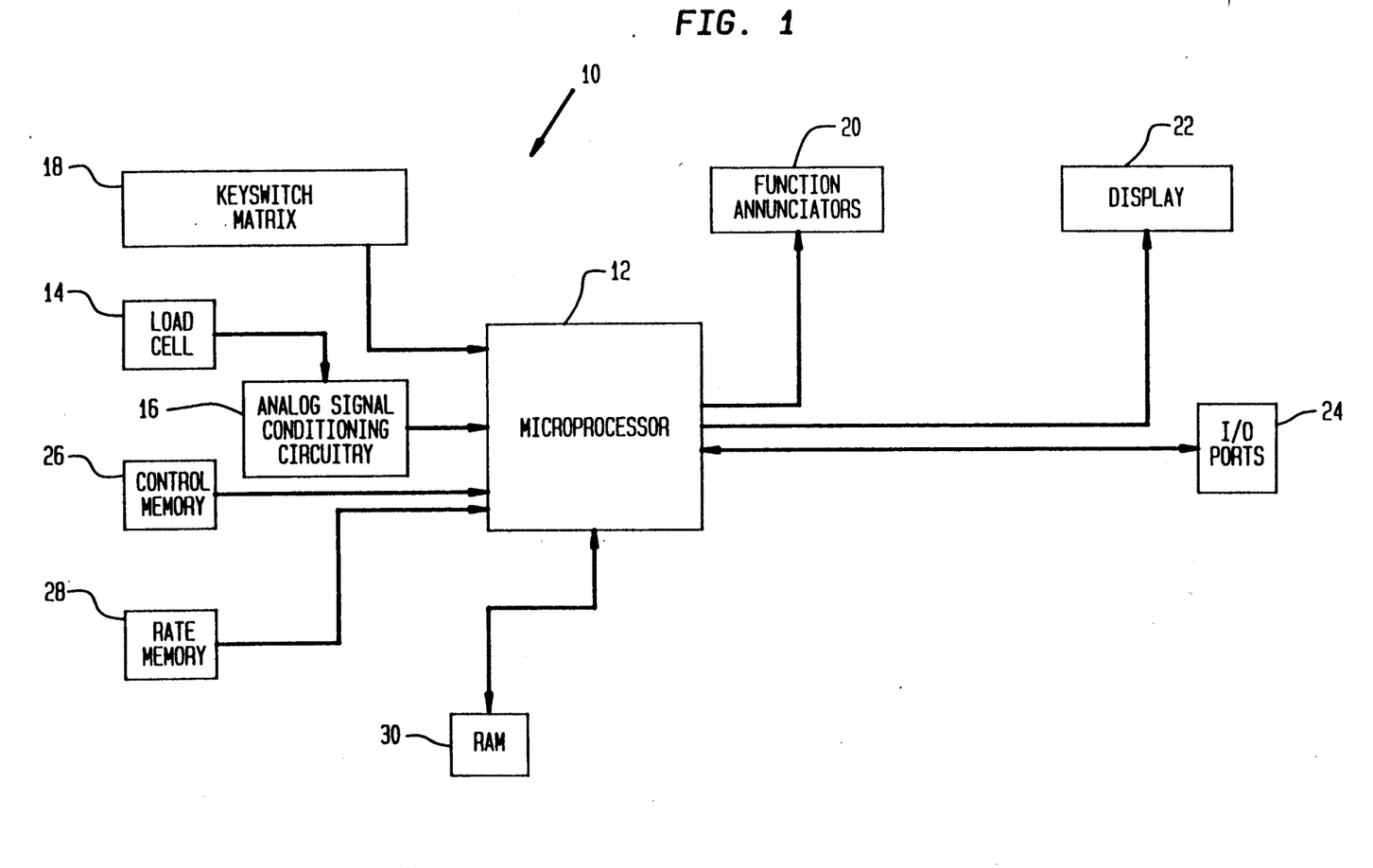
FIG. 1 is a block diagram of the electronic components of a postal scale according to the invention.

Referring to FIG. 1, the hardware arrangement of postal scale 10 is well known and includes microprocessor 12. In a preferred embodiment of the invention microprocessor 12 is a model 80C88 available from Intel Corporation, Santa Clara, Calif.

When an item to be mailed (not shown) is placed on the tray (not shown) of scale 10, conventional load cell 14 provides a signal indicative of the weight of the item. In a preferred embodiment of the invention load cell 14 is a Mark III load cell available from Weigh-Tronix, Inc., Santa Rosa, Calif.

In a manner well known to those skilled in the art, analog signal conditioning circuitry 16 receives the signal from load cell 14, conditions the signal and converts it into digital information which it provides to microprocessor 12. Microprocessor 12 converts the information into data representing the weight of the item in either metric or avoirdupois units.

Microprocessor 12 receives signals from keyswitch matrix 18, which preferably comprises a 6×7 matrix. Through keyswitch matrix 18 the user is able to select the desired class of service and to input alphanumeric information such as destination zone or postal code.

Microprocessor 12 drives function annunciators 20 and display 22. Function annunciators 20 are preferably light emitting diodes (LEDS), and indicate to the user what function(s) scale 10 is performing. Display 22 displays to the user alphanumeric information such as the weight or postal rate applicable to the item to be mailed as well as user instruction prompts and error messages. Display 22 preferably comprises a vacuum fluorescent display of 8 seven-segment numeric and 16 fourteen-segment alphanumeric characters.

Microprocessor 12 is interconnected with input/output ports 24, through which microprocessor 12 is able to control and/or exchange data with external devices (not shown) such as postage meters, parcel registers, printers, scanners or computers. Input/output ports 24 preferably comprise up to 8 ports of which some are adapted to RS232 communications, some are adapted to echoplex communications and some are configurable either for RS232 or echoplex.

Control memory 26 is accessible by microprocessor 12 and contains the software for controlling the operation of scale 10. Rate memory 28 is accessible by microprocessor 12 and contains a directory, postal code to zone conversion information and rate tables. Control memory 26 and rate memory 28 preferably comprise electrically programmable read only memory chips.

Random access memory (RAM) 30 is accessible by microprocessor 12 for read or write operations. RAM 30 is preferably battery backed up and is used, for example, for storing shipping transaction information from which manifests or activity reports may be generated.

In certain embodiments scale 10 may also include input devices such as a bar code reader, an optional character reader or a touch screen. These devices may be used for entry of item weight data or other information.

Figure 2:
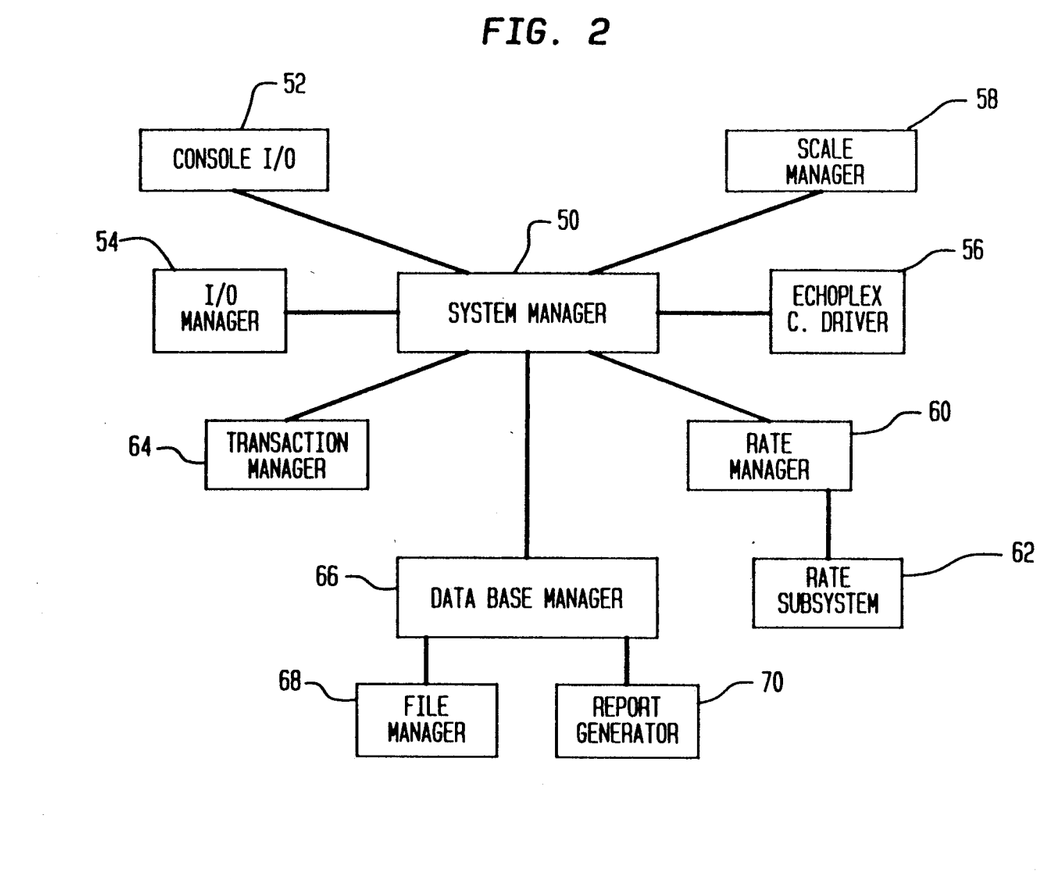
FIG. 2 is a representation of the software architecture of the scale of FIG. 1.

The software architecture of scale 10 is well known and may be described by reference to FIG. 2.

System manager 50 handles console input commands, weight display and interpretation and system level initialization. System manager 50 also updates global data structures and concurrently, via time slices, handles several of the software subsystems.

Console input/output module 52 interacts with system manager 50 and handles user interface through keyswitch matrix 18 and display 22. Module 52 may also be directed to handle input/output through an external terminal (not shown) and/or input from a barcode reader (not shown).

Input/output manager module 54 interacts with system manager 50 and manages input and output through input/output ports 24 with external devices (not shown) such as one or more line printers, a label printer, one or more barcode scanners, and a host computer.

Echoplex C-driver module 56 interacts with system manager 50 and manages echoplex communication through input/output ports 24 with external devices (not shown) such as a postage meter, a parcel register, a document printer and a mailroom management computer. Echoplex communication is described in U.S. Pat. Nos. 4,535,421 and 4,301,507.

Scale manager module 58 interacts with system manager 50 and maintains correct weight and scale status for the system. In addition to load cell 14 of scale 10, module 58 is able to manage a remote scale platform (not shown) and to receive manual weight input through keyswitch matrix 18.

Rate manager module 60 builds up the rate structure for the current transaction and provides an interface between system manager 50 and rate subsystem module 62. Rate subsystem module 62 accesses rate memory 28 in order to obtain the appropriate rate information from the appropriate rate table in rate memory 28.

Transaction manager module 64 interacts with system manager 50 and builds u for each transaction the transaction file to be recorded into the data base. Data base manager module 66 also interacts with system manager 50 and comprises file manage module 68 and report generator module 70. File manager module 68 handles file maintenance functions including appending, pack/unpack and search/void of individual transactions and indexing and sorting subsections of the data base. Report generator module 70 generates formatted reports for output through input/output manager module 54 to a line printer, document printer or label printer.

Operation of scale 10 to provide weights and rates in both weight measuring systems may be described by reference to FIG. 3. The operation begins with selection of the current units (step 102).

Upon power up of scale 10, one of the two weight measuring systems is selected as the system to be used for the next weighing operation. The system so selected will hereafter be referred to as the "current units". The weight measuring system that is not the current units at a given time, will be referred to as the "other units". The selection of the current units is preferably accomplished by setting or resetting a flag located in a specific memory location. The state of that flag is interpreted by the scale software as representing the selection of either metric units or avoirdupois units as the current units.

Microprocessor 12 converts digital information received from analog signal conditioning circuitry 16 into weight information denominated in both metric and avoirdupois units. Two separate algorithms are provided for conversion of the digital information, one for conversion to metric information, the other for conversion to avoirdupois information. Each algorithm is well known to those skilled in the art.

Depending on the state of the flag, either the metric or the avoirdupois weight information will be displayed and used for rating. If the flag is in a first state the metric information is used for display and rating. If the flag is in a second state, the avoirdupois information is used for display and rating.

In a preferred embodiment of this invention, metric units are selected as the current units each time scale 10 is powered up. Metric units are accordingly referred to as the "primary units". Thus, for the first weighing operation after power up the current units will be metric, unless the user changes the current units in the manner described below.

For subsequent weighing operations, the "Repeat Key" function, which is discussed below, may affect which weight measuring system will be the current units. For the purpose of the following discussion of FIG. 3 it will be assumed that the "Repeat Key" function has not been actuated.

The latest weighing/rating operation is complete, and the next weighing operation begins, when scale 10 senses, in a well known manner, that there is no item to be weighed present upon the tray of the scale 10. At that point, the primary units, i.e. metric, are selected as the current units (step 104) and the scale shows a zero weight in the current units on display 22.

The current units having been selected, scale 10 waits until an item is placed on the tray and a stable weight signal is provided by analog signal conditioning circuitry 16 (step 108). Alternatively, weight data may be input through keyswitch matrix 18 or by other input means such as a bar code reader. Once a stable, non-zero weight signal is provided, microprocessor 12 converts the weight signal into the current units, and the weight of the item in the current units is shown on display 22 (step 110). Microprocessor 12 also causes display 22 to display a prompt text, instructing the user to select a class (step 112). Scale 10 then waits until the user has selected a class (step 114). When the user has selected a class, through actuation of keyswitch matrix 18, the process of rate table look up begins.

It should be understood that for each class that may be selected by the user, there are four possible cases:

Case 1: Two rate tables, one defined in metric units and one defined in avoirdupois units, are available in rate memory 28.
Case 2: Only a rate table defined in the current units is available in rate memory 28.
Case 3: Only a rate table defined in the other units is available in rate memory 28.
Case 4: The class selected is not a valid class. If this occurs, scale 10 displays an error message such as "INVALID CLASS" and then once again prompts for class selection.

It will be assumed that a valid class is selected at step 114, so that Case 1, Case 2 or Case 3 applies.

Figure 3:
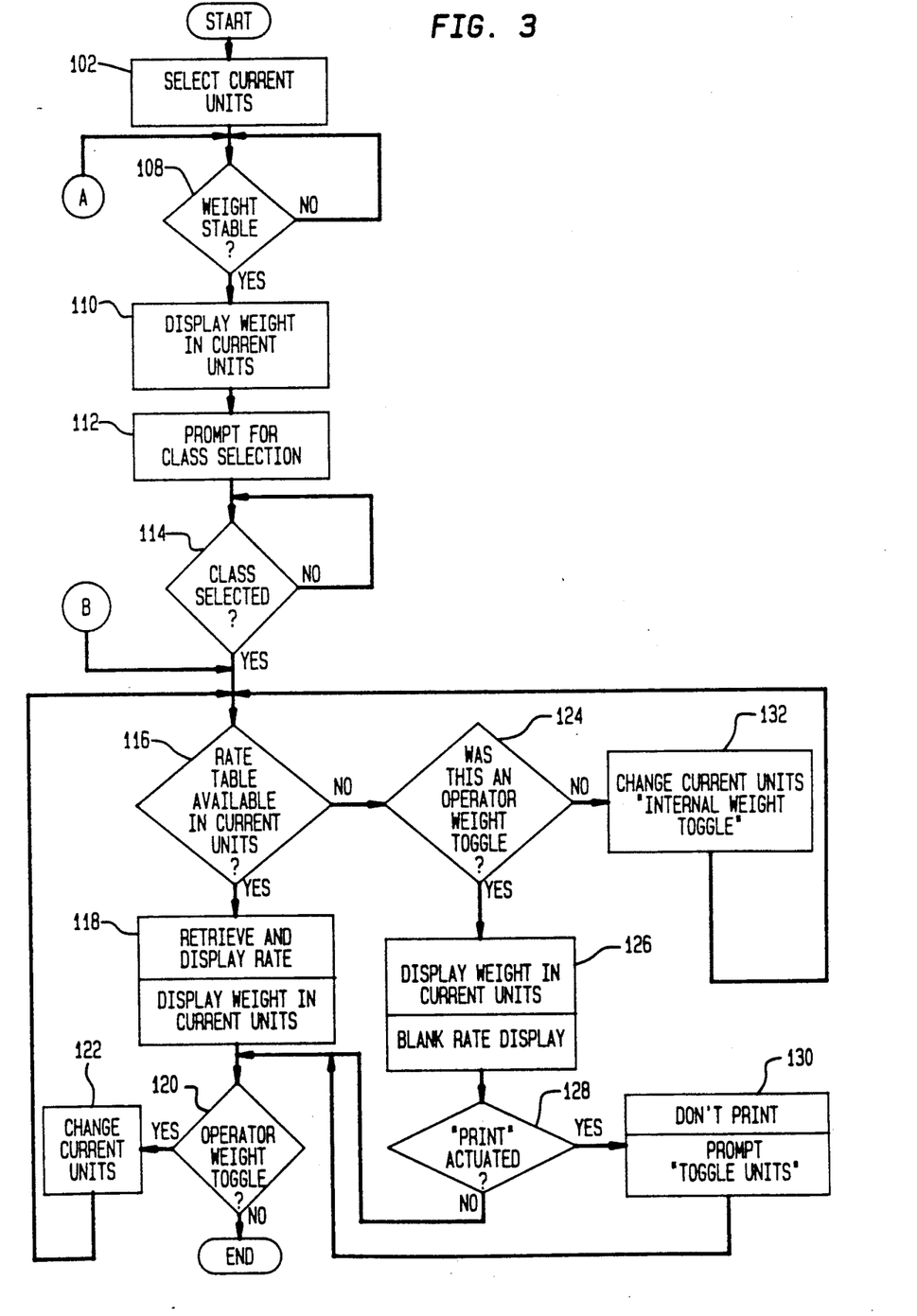
FIG. 3 is a flow chart of the operation of the scale of FIG. 1 with respect to selection of metric or avoirdupois weight units.

As will be seen, the table look up process, as illustrated in FIG. 3, will depend on which of those three cases is applicable to the selected class.

Case 1

First, let it be assumed that case 1 applies to the class selected at step 114. At step 116, system manager module 50 calls rate manager module 60 and passes to rate manager module 60 an indication as to whether the current units are metric or avoirdupois. Acting through rate subsystem module 62, rate manager 60 determines whether a rate table defined in the current units is available for the selected class (step 116). Since by assumption case 1 applies, such a rate table is available, and step 118 follows. At step 118, Rate Manager module 60 builds up the rate structure, the rate for the item is then displayed, and the weight in the current units continues to be displayed, all in a manner well known to those skilled in the art. If required by the rating process or by the user's application, step 118 may also include entry of destination information via keyswitch matrix 18, zip to zone conversion, setting and tripping of a postage meter or register or printing of a manifest transaction item, all of which are well known.

At any time after step 118, the user may via keyswitch matrix 22 actuate a change in the current units (step 120). This change will be referred to as "weight toggling". Such actuation brings about step 122 in which system manager 50 changes the state of the flag representing the current units. Thus, if the current units were metric before weight toggling, the changed state of the flag will cause the current units to become avoirdupois. Conversely, if the current units were avoirdupois before weight toggling, the changed state of the flag will cause the current units to become metric. The current units in effect after the change will be referred to as the "new current units".

A repetition of step 116 follows step 122. On this performance of step 116, rate manager 60 determines whether a rate table defined in the new current units is available for the previously selected class. Since it has been assumed for this Case 1 that rate tables are available for both weight measuring systems, step 118 again follows step 116. This time during step 118, display 22 shows the item's weight in the new current units and also shows a rate amount reflecting the rate table that is defined in the new current units.

The user may continue to actuate weight toggles if he desires, changing back and forth between the two weight measuring systems. Each time he does so the newly selected current units will be used for weighing and rating.

Case 2

It is now assumed that for the class selected in step 114 only one rate table is available, that one being defined in the current units as in effect at the time the class is selected. In this case the process continues through steps 116, 118, 120 (when actuated by the user) and then step 122, as described for Case 1 above. However, in this Case 2, during the repetition of step 116, which occurs after the operator-actuated weight toggling operation of steps 120 and 122, rate manager 60 determines that no rate table is available for the new current units and so indicates to system manager 50. Step 124 follows, in which system manager 50 determines whether the lates attempt to rate (step 116) followed an operator weight toggle (step 120). As this was the case, step 126 follows, in which display 22 shows the item's weight in the new current units, but no rate is displayed. Since no rate is displayed, there can be no printing of a manifest item, or setting of a postage meter or register. If "PRINT" is actuated at this point (Step 128), no printing occurs. Instead display 22 displays a prompt such as "Toggle Units" (Step 130).

At this point, or immediately after step 126 if "PRINT" is not actuated, scale 10 again is receptive to an operator weight toggle (step 120). If actuated by the user, steps 122 and 116 will follow, and this time step 118 will follow step 116, since the user will have "toggled back" to the weight measuring system for which rate table is available.

Case 3

It is now assumed that for the class selected in step 114 only one rate table is available, that one not being defined in the current units as in effect at the time the class is selected. In this case 3, during the first instance of step 116, rate manager 50 determines no rate table is available for the current units and so indicates to system manager 50. Step 124 folloWs, in which system manager 50 determines whether the latest step 116 fōllowed an operator weight toggle. As this was not the case (because step 116 followed step 114), the next step is step 132, in which system manager 50 changes the state of the flag representing the current units. As before, that change causes the current units to change from metric to avoirdupois or from avoirdupois to metric, as the case may be. As this weight toggle is actuated by scale 10 itself, rather than by the user, it will be referred to as an "internal weight toggle".

Following step 132 is a repetition of step 116. By assumption, a rate table for the selected class and defined in the new current units is available. Accordingly step 118 follows, the item's weight is shown in the new current units and rate information is shown reflecting the rat table defined in the new current units.

If an operator weight toggle is now actuated (steps 120 and 122), the resulting step 116 will be followed by steps 124 and 126, because the user will have "toggled back" to the weight measuring system for which n rate table is available.

In a preferred embodiment of the invention, scale 10 is receptive to operator weight toggling, not only at the times referred to above, but also at any other time that an operator instruction prompt is not displayed on display 22 and keyswitch matrix 18 is polled for input. It should be understood that each time operator weight toggling occurs, it is actuated by the user through keyswitch matrix 18. Microprocessor 12 detects such actuation and changes the state of the flag for indicating the current units, as discussed above. Thereafter, the new current units will be used for rating and weight display until the state of the flag is again changed by, e.g. an internal weight toggle, another operator weight toggle, or power down and power up.

Figure 4:
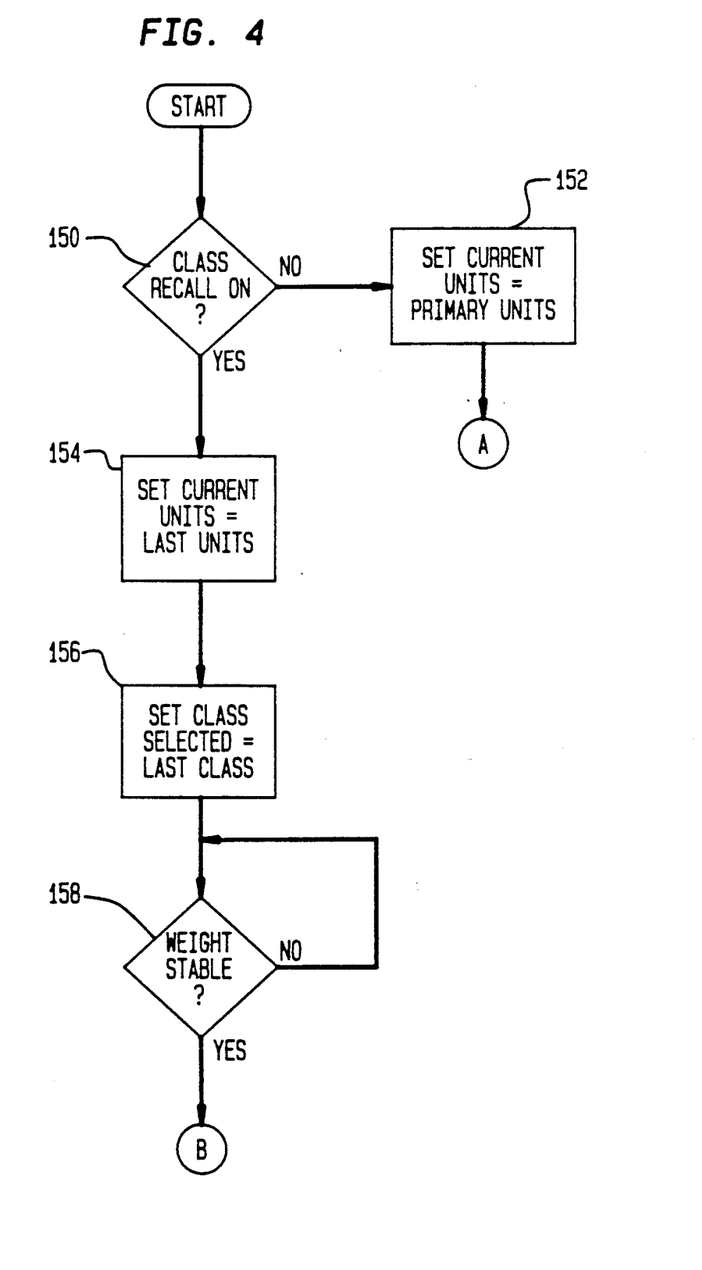
FIG. 4 is a flow chart of the operation of the scale of FIG. 1 with respect to a "Repeat Key" function.
Figure 5:
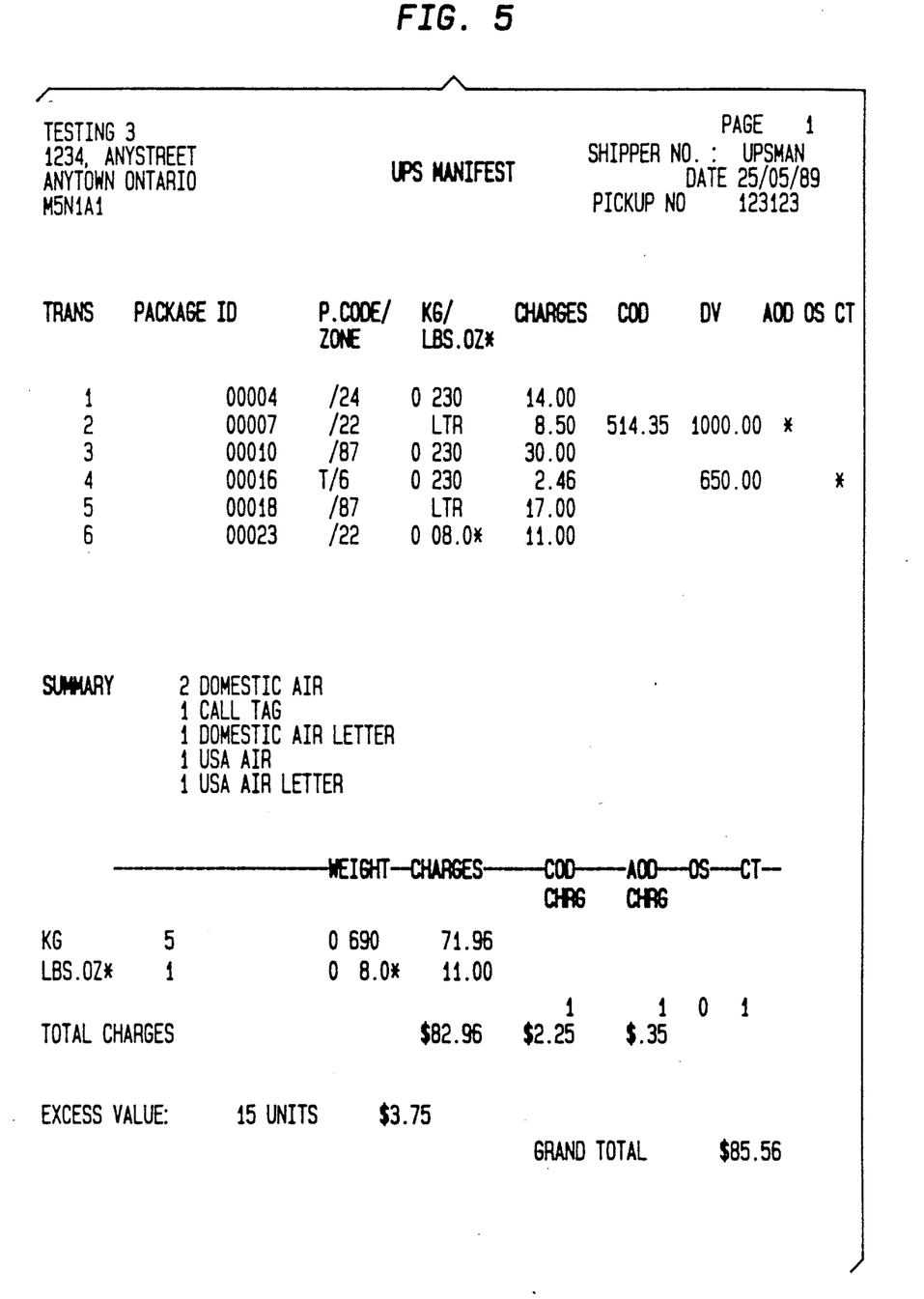
FIG. 5 is a sample manifest generated by the scale of FIG. 1.

The "Repeat Key" function may be described by reference to FIGS. 4 and 3. Operation of the "Class Recall" function commences at completion of a previous weighing and rating operation by actuation of the "Repeat Key" function through keyswitch matrix 18 (step 150). If "Repeat Key" is not actuated, the primary units are selected to be the current units (step 152) and step 108 of FIG. 3 follows. If the "Repeat Key" function is actuated, the most recent current units from the previous operation are selected to be the current units (step 154) and the class most recently selected in the previous operation is selected as the class to be used for rating in the present operation (step 156) scale 10 then waits until an item is placed on the tray and a stable weight signal is provided by analog signal conditioning circuitry 16 (step 158). Step 116 of FIG. 3 then follows step 158.

Having thus described an embodiment for weighing and rating items in both metric and avoirdupois units, its advantages can be appreciated. Variations of the described embodiment may be made without departing from the scope of the invention.

What is claimed is:

1. A postal scale comprising:
   (a) weighing means for supplying a signal representative of the weight of an item;
   (b) weight selecting means for selecting a current system of weights from a predetermined plurality of systems of weights;
   (c) class selecting means for selecting a desired class of service from a predetermined plurality of classes of service;
   (d) rate table memory means for storing a plurality of rate tables, said memory means storing at least one rate table for each of said classes of service, said plurality of rate tables comprising at least one rate table defined in a first of said systems of weights, said plurality of rate tables comprising at least one other rate table defined in a second of said systems of weights; and
   (e) calculating means, responsive to said weighing means, said weight selecting means and said class selecting means, for calculating a postal rate for said item as a function of the weight of said item and in accordance with said desired class of service; said calculating means accessing said at least one rate table if said current system is said first system of weights; said calculating means accessing said at least one other table if said current system is said second system of weights.

2. A postal scale as described in claim 1 wherein said plurality of systems of weights includes a primary system of weights and said weight selecting means is responsive to an initialization signal generated whenever said scale is activated to select said primary system of weights as said current system of weights.

3. A postal scale as described in claim 2 further comprising input means for input of signals by an operator and wherein said weight selecting means is responsive to a particular signal from said input means to change said current system of weights.

4. A postal scale as described in claim 3 wherein said class selecting means is responsive to other signals from said input means to select said desired class of service and said weight selecting means is responsive to selection of said desired class and said current system of weights to change said current system of weights when said current system and said desired class are incompatible.

5. A postal scale as described in claim 1 wherein said predetermined plurality of systems of weights comprises the avoirdupois system and the metric system and said calculating means is adapted to calculate a postal rate for said item according to the avoirdupois system and according to the metric system.

6. A postal scale as described in claim 5 wherein said plurality of systems of weights includes a primary system of weights and said weight selecting means is responsive to an initialization signal generated whenever said scale is activated to select said primary system of weights as said current system of weights.

7. A postal scale as described in claim 6 further comprising input means for input of signals by an operator and wherein said weight selecting means is responsive to a particular signal from said input means to change said current system of weights.

8. A postal scale as described in claim 7 wherein said class selecting means is responsive to other signals from said input means to select said desired class of service and said weight selecting means is responsive to selection of said desired class and said current system of weights to change said current system of weights when said current system and said desired class are incompatible.

9. A postal scale comprising:
   (a) weighing means for supplying a weight signal representative of the weight of an item;
   (b) input means for generating input signals, said input signals including a weight system selection signal and a class selection signal;
   (c) a memory for storing rate table data; and
   (d) a microprocessor programmed for:
      i) receiving said weight signal from said weighing means;
      ii) receiving said input signals from said input means;

iii) selecting a weight system from a predetermined plurality of weight systems in accordance with said weight system selection signal;
iv) selecting a class of service in accordance with said class selection signal;
v) determining whether said memory stores a rate table for said selected class that is defined in terms of said selected weight system;
vi) calculating a postal rate for the item in accordance with said weight signal, said selected weight system, and rate table data stored in said memory, if said microprocessor determines that said; and memory stores such a rate table; and
vii) if said microprocessor determines that said memory does not store such a rate table, selecting another weight system and calculating a postal rate for the item in accordance with said weight signal, said other selected weight system, said class selection signal, and rate table data stored in said memory.

10. A postal scale as described in claim 9, wherein said rate table data comprises at least one metric rate table and at least one avoirdupois rate table.

11. A postal scale as described in claim 10, wherein said microprocessor applies a first algorithm to said weight signal, thereby generating metric weight information corresponding to said weight signal and said microprocessor applies a second algorithm to said weight signal, thereby generating avoirdupois weight information corresponding to said weight signal.

12. A postal scale as described in claim 10, further comprising a printer and wherein said microprocessor is programmed for generating a report and causing said printer to print said report, said report comprising a plurality of transaction line items, at least one of said line items comprising metric weight information and a second at least one of said line items comprising avoirdupois weight information.

13. A postal scale as described in claim 12, wherein said report is a parcel carrier manifest.

14. In a postal scale having weighing means, calculating means, weight system selecting means, class selecting means, and a memory that stores rate tables, the method comprising the steps of:
(a) selecting a weight system;
(b) selecting a class;
(c) weighing an item to be mailed;
(d) determining whether said memory stores a rate table for said selected class that is defined according to said selected weight system; and
(e) if said memory stores such a rate table, calculating a shipping charge for said item to be mailed in accordance with the weight of said item, said selected class and said selected weight system.

15. The method as claimed in claim 14, further comprising the steps of (f) selecting another weight system if said memory does not store such a rate table; and
(g) calculating a shipping charge for said item to be mailed in accordance with the weight of said item, said selected class and said other selected weight system.

* * * * *